ent Office 2,845,329
Patented July 29, 1958

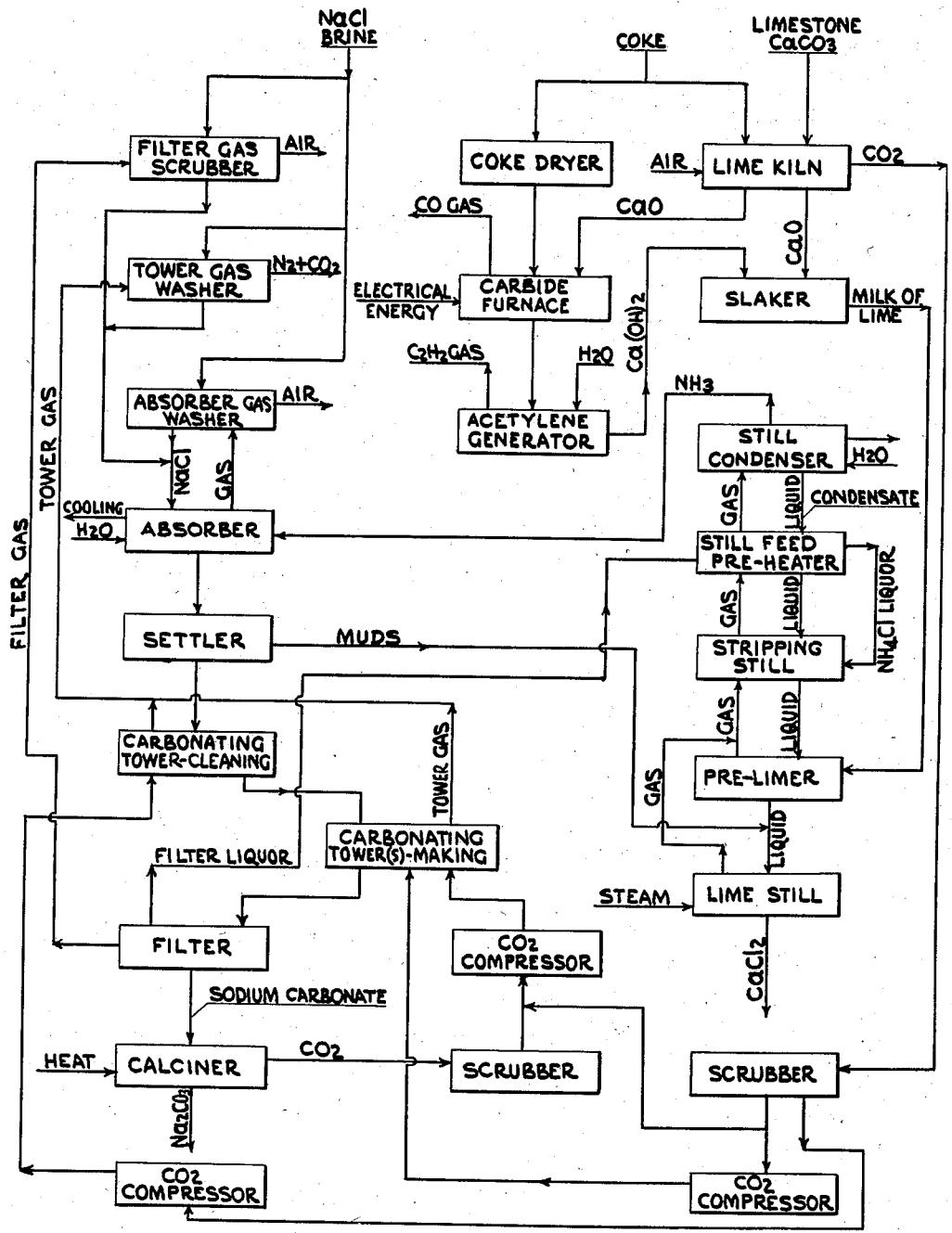

2,845,329

PROCESS FOR MAKING SODIUM CARBONATE AND ACETYLENE

Joseph A. Neubauer and Francis W. Theis, Pittsburgh, Pa., assignors to Columbia-Southern Chemical Corporation, Allegheny County, Pa., a corporation of Delaware Continuation of application Serial No. 535,109, September 19, 1955. This application July 29, 1957, Serial No. 674,852

11 Claims. (Cl. 23—63)

The present invention involves a novel method of preparing actylene and sodium carbonate.

The process of the present invention affords an economical, integrated method whereby the aforementioned products are produced. Acetylene, for instance, may be produced according to the present invention with a modicum of investment. In so producing the acetylene a by-product, calcium hydroxide, is formed which has an essential role in the integrated process, as will be demonstrated hereinafter.

Briefly, the present invention involves the calcination of calcium carbonate to produce calcium oxide and carbon dioxide. The thus-formed carbon dioxide is then reacted with ammonia and a solution of sodium chloride (brine) to produce ammonium chloride and sodium bicarbonate, the ammonium chloride being then separated from the sodium bicarbonate and the sodium bicarbonate being decomposed to sodium carbonate and carbon dioxide. This carbon dioxide is used to supplement the carbon dioxide used to react with brine and ammonia, as hereinabove described. A portion of the calcium oxide produced by the calcination step aforementioned is then treated with carbon to produce calcium carbide, which calcium carbide is then reacted with water to produce acetylene and calcium hydroxide, the acetylene being separated therefrom. The ammonium chloride produced as described above is then reacted with the calcium hydroxide just-mentioned and the remaining portion of calcium oxide produced as described above to produce ammonia and calcium chloride, said ammonia being recycled for further reaction with sodium chloride and carbon dioxide to produce sodium bicarbonate, etc.

It can be readily seen from this novel process that extremely efficient utilization of the by-products is realized. For example, in the steps involving the reaction of calcium oxide with carbon to produce calcium carbide and the reaction of resulting calcium carbide with water to produce acetylene and calcium hydroxide, the products acetylene and calcium hydroxide are separated from each other and the calcium hydroxide is then reacted with ammonium chloride. The acetylene, of course, is a very valuable product in itself. The reaction between CaO and C produces CO as well as $CaC_2$, which CO may be oxidized to $CO_2$ and employed in the aforementioned carbonation step.

The flow sheet clearly demonstrates what has been referred to hereinabove as an economical, integrated process. Since the economy of any chemical process is dependent, for the most part, on efficient utilization of by-products and the consolidation of reaction steps, it is easy to see that the present invention affords a novel and unique chemical achievement.

It will be noted from the flow sheet that calcium carbonate (e. g., limestone) is decomposed to CaO and $CO_2$. For the purpose of the present invention this may be done in any suitable apparatus, e. g., a vertical shaft kiln, the temperature being maintained at about 900° to 1300° C., preferably 1050° to 1200° C. The $CO_2$ thus formed is passed through and reacted with a solution of sodium chloride (brine) saturated with ammonia. Brine is economically ammoniated by means of $NH_3$-containing by-product gases produced at various stages of the process of the present invention, as will be seen hereinafter. The reaction of ammoniated brine with $CO_2$ is generally carried out in carbonating towers whereby downwardly flowing ammoniated sodium chloride solution is admixed with an upwardly flowing carbon dioxide-containing gas.

The ammoniated brine is cooled to about 30° C. prior to being introduced into the carbonating towers. Hot ammoniated brine, if fed to the top of said towers, would undergo excessive evaporation of ammonia by the $CO_2$-containing gases flowing countercurrently thereto. Even at 30° C. or thereabouts, the $CO_2$-containing gas not absorbed by the ammoniated brine with which it comes in contact contains a certain amount of ammonia; when discharged from the towers this ammonia-containing gas may then be employed to ammoniate additional brine, as hereinabove stated.

As an engineering expediency the carbonating step may consist of two separate steps. For example, when four carbonating towers are employed in parallel and one begins to function improperly due to $NaHCO_3$ solids encrusting the inner surfaces thereof it may be converted to a cleaning carbonating tower. That is, a lean $CO_2$-containing gas (about 40 volume percent $CO_2$) is fed to the encrusted tower in countercurrent contact with the downwardly flowing brine, the brine being carbonated to just below the precipitating point. The liquor drawn from said tower, having dissolved and entrained the $NaHCO_3$ solids encrusting the inner surfaces, is then admitted to the remaining making towers and carbonated to the precipitation point. Having once removed said solids from the cleaning tower it may be converted to a making tower.

It is also within the purview of the present invention to operate two or more cleaning carbonating towers in parallel and, of course, two or more making carbonating towers in parallel.

From the lower section of the carbonating towers a product containing sodium bicarbonate and ammonium chloride is drawn, the ammonium chloride being in a liquid state and having sodium bicarbonate solid particles dispersed therein. This product is conducted to a filter, such as a filter wheel, which effects the separation of sodium bicarbonate solids from the ammonium chloride liquor. The sodium bicarbonate thus separated is conducted to a calcining drum maintained at a temperature of from about 150° C. to 225° C., preferably 175° C. to 200° C. On passing through the drum the sodium bicarbonate is decomposed to sodium carbonate and carbon dioxide. The carbon dioxide thus formed is normally of 85 to 100 percent by volume purity and is introduced into the aforementioned carbonating towers (along with a portion of the $CO_2$ produced in the $CaCO_3$-calcining step described hereinabove) for use in carbonating more ammoniated brine. The sodium carbonate thus produced is removed from the drum and stored.

Obviously gases such as $CO_2$ produced throughout the process may be scrubbed, concentrated, diluted, compressed, and otherwise treated whenever and wherever engineering expediency dictates. According to a particular embodiment of the present invention, part of the $CO_2$ gas produced in the $CaCO_3$-calcining step and containing about 40 percent by volume $CO_2$ is admixed with the $CO_2$ produced in the $NaHCO_3$-calcining step and containing about 95 to 100 percent by volume $CO_2$, the admixture being then employed in the making carbonating towers. Part of the remaining 40 percent by volume $CO_2$ from the $CaCO_3$-calcining step is employed in the cleaning carbonating tower or towers. As stated hereinabove, the concentration of the $CO_2$ gas entering the cleaning tower is lower than that entering the making tower. It is advisable, pursuant to this embodiment, to maintain a pressure of about 40 pounds per square inch gauge on the $CO_2$ fed to the respective carbonating towers, although a pressure of about 20 pounds per square inch gauge is desirable for certain other functions, as will be seen hereinafter.

The ammonium chloride liquor separated from sodium bicarbonate on the filter wheel is conducted to the first stage of an $NH_3$-distillation system which comprises passing the liquor through a preheater where it is heated to a temperature between 82° and 94° C. It is then led to a stripping still (wherein some of the free ammonia present in the liquor is removed), admixed with calcium hydroxide in a prelimer and then conducted to a lime still.

In order to properly define the present invention it is necessary to return to the second leg of the calcium carbonate calcining step aforementioned in order to disclose the source of the calcium hydroxide needed for the just-mentioned lime still reaction with ammonium chloride. A more detailed description of the $NH_3$-distillation system will follow.

As aforementioned, calcium carbonate is decomposed to calcium oxide and carbon dioxide. A portion of the calcium oxide thus produced (see flow sheet) is introduced into an electric furnace where it is reacted with coke. Generally the lime and coke are mixed prior to their introduction into the electric furnace, the lime-to-coke ratio being usually a little greater than theoretical.

A very serviceable furnace is the electric furnace which is, briefly, but a circular, square or rectangular shell having an inner sidewall liner of firebrick and a bottom consisting of a hearth made up of carbon blocks or anthracite. The top of the furnace may be open. There are tapholes through the sidewalls just above the upper level of the hearth. Several electrodes are vertically suspended in the furnace and extended to a predetermined point below the level of the charge to the furnace, generally about 1 to 3 feet below the level of the charge.

The furnace is brought to a temperature of about 2000° to 2200° C. and a product containing 80 to 90 percent by weight $CaC_2$ is generally produced; it is removed through the aforementioned tapholes. The hot CO formed during the reaction may be converted to $CO_2$ on contacting the atmosphere and may be recovered and employed in the instant system, such as in the carbonating step previously mentioned. Here again, the economy and uniqueness of the present invention are clearly demonstrated. Alternatively, the CO emanating from the carbide furnaces may be oxidized to produce a gas having a high concentration of $CO_2$, which gas may be used in conjunction with the $CO_2$-containing gas from the $CaCO_3$-calcination step and thereby provide enough $CO_2$ to the process of the invention without the necessity of calcining the $NaHCO_3$ removed from the filter wheel.

The $CaC_2$ removed from the furnace through the tapholes is cooled. An efficient cooling method is the continuous casting method which comprises tapping the fluid $CaC_2$ into small buckets, pans or pots fastened to a conveyor belt or wheel. The $CaC_2$ is allowed to cool therein and then dumped into large jaw crushers and pulverized. The calcium carbide thus prepared is introduced into an acetylene generator where it is reacted with $H_2O$. The reaction between calcium carbide and water is virtually instantaneous and acetylene is produced as an offgas while a calcium hydroxide slurry remains in the reactor.

A serviceable acetylene generator comprises a cylindrical water shell placed on end and surmounted by housing containing the carbide feed mechanism. The water shell has means for filling and draining. Acetylene generated therein is led by conduit from the water shell to any desired point. The generator should be so designed as to provide one gallon of water capacity for each pound of calcium carbide and an acetylene generating rate of one cubic foot per hour per pound of carbide. The reactants are fed to the generator at ambient temperature (22° C., plus or minus 5° C.).

According to another particular embodiment of the present invention the calcium hydroxide formed in the generator is removed and introduced into a rotary slaker and enriched with a portion of the calcium oxide removed from the aforementioned calcium carbonate calcining operation (see flow sheet). The CaO slurry removed from the acetylene generator must be enriched since it contains less than about 15 percent, usually about 10 percent CaO by weight. A CaO slurry of about 20–35 percent by weight concentration is desirable, preferably about 27 percent by weight, i. e., approximately 276 grams of active CaO per liter.

The rotary slaker used for the present invention comprises a revolving, cylindrical shell having a discharge end and a tail end, the discharge end having an inner shell concentrically-located and extending therein about one-fourth the length of the outer shell. The $Ca(OH)_2$ slurry from the generator enriched with CaO from the $CaCO_3$-calciner enters at the discharge end through the inner shell. The milk of lime produced is drawn from between the inner and outer shells at the same end. The slowly digesting and undigested matter is propelled to the back so that it has a very long time to give up all its suspended particles to the milk. At the tail end undigested material is removed and disposed of.

According to a still further modification of the present invention, the total lime produced in the lime kiln is fed to the $CaS_2$ furnace and reacted with coke. The $CaC_2$ produced is conducted to the acetylene generator and reacted with water to form acetylene and $Ca(OH)_2$, the latter being in slurry form. This slurry is directed to a settler where the $Ca(OH)_2$ settles out and the clear supernatant liquid is removed and recycled to the acetylene generator. The settling step may be so regulated as to afford a $Ca(OH)_2$ slurry having the hereinabove stated CaO concentration.

The milk of lime removed from the slaker is introduced into a prelimer according to the instant process. In the prelimer, which may be but a vessel having a stirrer therein, the ammonium chloride liquor aforementioned and the slaked lime are intermingled yielding a mixture having a temperature of about 98° C. The ammonium chloride liquor prior to being conducted to the prelimer is introduced into a stripping still which may consist of the upper portion of the aforementioned lime still, said upper portion containing a bed of coke or quartz, and from thence it is removed to the prelimer. From the prelimer the mixture of ammonium chloride liquor and calcium hydroxide are introduced into the lime still at a point just below the coke bed and are made to flow downwardly over a series of vertically-disposed plates. Countercurrently thereto a stream of steam at about 112° C. is introduced causing a reaction yielding calcium chloride and ammonia. The calcium chloride is removed from the base of the lime still. Steam and ammonia emanating from the lime still passes upwardly through the aforementioned stripping still and into the preheater (see flow sheet). Said steam-ammonia mixture serves to heat the ammonium chloride liquor passing through the preheater to a temperature ranging from 82° to 94° C., as stated above. The preheater comprises a cylindrical shell having tubes disposed therein through which ammonium chloride solution is conducted. The steam-ammonia mixture envelops said tubes in passing, thus affecting a heat exchange. Subsequent to this heat exchange the steam-ammonia mixture is introduced into a condenser maintained at a temperature of about 30°

C. The condenser may be integrated with the preheating apparatus and thereby form one unit. The condenser, like the preheater, may comprise a shell containing a bank of tubes through which water at about 30° C. is made to flow.

The heat exchange between the steam-ammonia mixture and the 30° C. tubes condenses the steam to water and ammonia gas may then be removed from the condenser. Steam thus condensed is saturated with ammonia, however, and may be recycled to the aforementioned ammonium chloride liquor conduit at a point just prior to its entry into the stripping still. In this manner ammonia gas so valuable to the process is not squandered.

The flow sheet would suggest another modification wherein the apparatus is so constructed that the condensate issuing from the still condenser passes first through the still feed preheater and thence to the stripping still. It is apparent that numerous engineering ramifications are possible and clearly within the scope of the present invention.

The ammonia gas removed from the condenser has a temperature of approximately 55° C. to 60° C. and is conducted to an absorber wherein it is contacted with purified brine. The purification of brine will be discussed hereinafter.

The ammonia gas is introduced at the base of a vertically-extended absorber and is led upward countercurrently to a downwardly-flowing purified brine solution. The absorber is maintained at a temperature of about 60° to 65° C. by means of coils contained therein, which coils are fed with water. By this method known as the ammoniating step, the purified brine is saturated with ammonia. The ammoniated brine is then conducted to a settler where muds are removed from the brine, then to a cooler where its temperature is lowered to about 30° C. and then to the aforementioned carbonating towers where it is made to descend over plates and is reacted with a countercurrent flow of carbon dioxide, etc. The muds thus separated from the ammoniated brine are directed to the lime still where they are admixed with the $Ca(OH)_2$-$NH_4Cl$ mixture entering said still. Thus valuable materials, such as $NH_3$-gas entrapped in the muds, are recaptured.

The lime still, stripping still, preheater, condenser and absorber may be kept under vacuum to maintain a minimum back pressure on the system. This is readily effected by attaching a vacuum pump to the absorber, for instance.

To prevent contamination of the absorber and the carbonating tower(s) during the instant process it is necessary that brine be purified, since most brines contain impurities such as $Ca^{++}$ and $Mg^{++}$. One method involves scrubbing the brine with effluent gases from the carbonating towers, the absorber and the filter (see flow sheet). Since these gases contain carbon dioxide and ammonia they react readily with the impurities to form readily-removable carbonates thereof. Furthermore, much of the ammonia present in the effluent gases is absorbed by the brine and thus this step reduces the amount of ammonia required to ammoniate the brine in the absorber. In this purification method, therefore, the ammonia absorption step has its inception in the brine purification step.

As seen the flow sheet, effluent gases from the absorber, the carbonating towers and the filter are fed to washers or scrubbers through which only portions of the total feed are made to pass. Here again, various other embodiments within the skill of the art are within the scope of the present invention.

Another particularly efficacious method of purification, for example, consists in treating the brine with lime and soda ash. Soda ash acts to eliminate calcium while the magnesium present is precipitated by lime. This treatment is preferably done in the cold and requires a slight excess of lime and soda ash, based on the magnesium and calcium impurities present in the brine. The impurities settle out as a sludge and a clear brine remains.

There should be a proper ratio of ammonia to sodium chloride in the ammoniated brine. The chlorine titer (which represents sodium chloride) should be kept as high as possible. One titer is one-twentieth of one normal. Thus, the sodium chloride concentration in the ammoniated brine should be below about 90 chlorine titer. If the ammonia concentration in the brine is too high excessive amounts of ammonium bicarbonate are precipitated with the sodium bicarbonate. If the concentration of ammonia in the brine is too low the decomposition of sodium chlorine is relatively smaller and therefore much of the salt is wasted.

A particularly important step of the present invention involves the aforementioned heating of CaO (produced by the decomposition of calcium carbonate) with coke to form calcium carbide and carbon monoxide, the calcium carbide thus formed being separated from its CO by-product and reacted with water to form acetylene and calcium hydroxide. The reaction between CaO and coke is efficiently carried out at temperatures of about 2000°–2200° C., as stated above, while the $CaC_2$–$H_2O$ reaction goes well at ambient temperatures. It is both an economical and practical feature of the present invention that all or substantially all of the calcium carbide produced reacts directly with water to convert all or substantially all of the calcium carbide to acetylene and calcium hydroxide.

By way of illustration the following example depicts a particular embodiment of the present invention:

*Example*

12,650 pounds of limestone (97 percent by weight $CaCO_3$) and 1,010 pounds of coke (86 percent by weight fixed carbon and 2 percent by weight $H_2O$) are admixed and fed into the top of a vertical shaft limestone kiln and calcined for 38 hours at 1100° C., thereby producing $CO_2$-containing gas (40 percent $CO_2$ by volume; 8,390 pounds of $CO_2$) and 6,220 pounds of lime consisting of 93 percent by weight available CaO. 1,950 pounds of the lime thus produced and removed from the bottom of the kiln is admixed with 1,250 pounds of coke (pre-dried and containing 88 percent by weight fixed carbon and less than 1 percent by weight $H_2O$) and conveyed to an electric carbide furnace. The mixture is intermittently introduced through the top of the furnace. The furnace consists of a circular shell having an inner sidewall liner of firebrick and a bottom consisting of a hearth made up of carbon blocks. Three electrodes are suspended vertically within the furnace shell and extended 2 feet below the furnace charge. The furnace is maintained at a temperature of 2000° C.

Just above the upper level of the hearth are tapholes through the sidewalls used to remove molten $CaC_2$ from the furnace. Of 2,000 pounds of material tapped, 1,600 pounds is $CaC_2$ and 380 pounds is CaO and 20 pounds inerts. The material thus removed is allowed to flow into small pans fastened to a conveyor belt. Having cooled in these pans it is then removed therefrom and introduced into a large jaw crusher and pulverized. 700 pounds of CO gas is removed overhead from the carbide furnace.

From the crusher the $CaC_2$–CaO material is conducted to an acetylene generator where it is admixed at ambient temperature 22° C., plus or minus 5° C.) with 16,660 pounds of water. A reaction occurs virtually instantaneously and acetylene (630 pounds) is taken off overhead and collected.

1,740 pounds of CaO in the form of $Ca(OH)_2$ (representing 9.5 percent by weight of CaO in a water slurry) is removed from the acetylene generator and introduced into a rotary slaker. Also introduced therein is the CaO remaining (4,270 pounds) from the $CaCO_3$-calcining step (and not utilized in the $CaC_2$-making step). The rotary slaker consists of a revolving, cylindrical shell having a discharge end and a tail end, the discharge end having an inner shell concentrically-located and extending therein one-fourth the length of the outer shell.

The $Ca(OH)_2$ slurry from the generator and the CaO from the $CaCO_3$-calcining step are admixed and introduced through the inner shell. The milk of lime produced in the slaker is drawn from between the inner and outer shells at the discharge end while the slowly digesting and undigested material is propelled to the back, the undigested material being removed from the tail end.

A $Ca(OH)_2$ slurry is thus produced containing 27 percent by weight of CaO in the form of $Ca(OH)_2$ and 16,660 pounds of water, that is, about 276 grams CaO per liter. 975 pounds of undigested material is removed from the rotary slaker and disposed of. The $Ca(OH)_2$ slurry is introduced into a prelimer and admixed with ammonium chloride.

The ammonium chloride is prepared by introducing 6,160 gallons of a purified brine (15,920 pounds of NaCl) into the top of a vertically-extended absorber containing water-fed coils for temperature control and ammoniating with 5,650 pounds of ammonia gas at 57° C. introduced at the base of the absorber and made to flow countercurrently to the downwardly flowing brine. Effluent gases taken overhead from the absorber are used to purify approximately a one-sixth portion of the 6,160 gallons of brine referred to hereinabove. For this purpose an absorber gas washer is employed which is but a tower having numerous gas bubble caps disposed therein through which gas passes and is contacted with the brine flowing downwardly therethrough. Purification of the remaining brine will best be defined and understood as the process of the present example unfolds.

The ammoniated brine is conducted to a Dorr tank settler wherein muds settle out and are removed to a lime still (to be described hereinafter). The ammoniated brine is then introduced into a cooler where its temperature is brought down to 30° C. and then to the top of a cleaning carbonating tower and made to flow downwardly therein. Countercurrently thereto $CO_2$-containing gas (16,700 cubic feet of gas having 40 volume percent $CO_2$ representing 1,050 pounds of $CO_2$) is introduced at a pressure of 40 pounds per square inch gauge. This $CO_2$ gas is a portion of the $CO_2$ gas (40 percent $CO_2$ by volume) produced in the limestone kiln above-described, which portion has been scrubbed and compressed (see flow sheet).

The effluent from this step is taken overhead and introduced into a tower gas washer where it is used to purify approximately a two-third portion of the 6,160 gallon brine solution fed to the system as described hereinabove (see flow sheet).

Having thus been subjected to the cleaning carbonating tower the ammoniated brine is divided into four equal streams and conducted to four making carbonating towers arranged in parallel where it is subjected to $CO_2$-containing gases emanating from several sources and introduced at several points in the tower.

One stream of gas fed in equal proportions to the 4 towers originates from both the limestone kiln and the $NaHCO_3$-calcining drum; that is, a portion (1,795 pounds of $CO_2$) of it is made up from the $CO_2$-containing gas (8,390 pounds of $CO_2$ representing 40 volume percent $CO_2$) produced by the limestone kiln and the other portion consists of substantially all the $CO_2$-containing gas (3,555 pounds $CO_2$ representing 95 volume percent $CO_2$) from the $NaHCO_3$-calcining step to be described hereinafter. Each portion is separately scrubbed prior to being admixed; the total mixture is then compressed to make a $CO_2$-containing gas having a pressure of 40 pounds per square inch gauge and a concentration of 65 volume percent $CO_2$, there being 72,900 cubic feet of gas in all.

Another stream of $CO_2$-containing gas (3,080 pounds $CO_2$ representing 40 percent by volume $CO_2$) emanating from the limestone kiln total production of $CO_2$ is fed in equal proportions to the 4 towers (see flow sheet). It is scrubbed and compressed to 20 pounds per square inch gauge. This stream also amounts to 72,900 cubic feet of gas.

The former stream of $CO_2$-containing gas is introduced into the making carbonating towers at the base thereof, in a countercurrent fashion as in the cleaning carbonating tower. The latter stream is introduced into the central portion of the tower, hence the difference in gas pressure. The effluent gases removed from the making carbonating towers are added to the effluent gases from the cleaning carbonating tower and introduced into the tower gas washer as described above (see flow sheet).

From the lower section of the making carbonating towers a product containing sodium bicarbonate and ammonium chloride and having a 25° C. temperature is removed and subjected to filtration on a filter wheel which separates the sodium bicarbonate solids from the ammonium chloride liquor. 16,100 pounds of sodium bicarbonate thus separated is conducted to a calcining drum maintained at a temperature of 190° C. On passing through the drum the sodium bicarbonate is decomposed to sodium carbonate and carbon dioxide, the carbon dioxide being of 95 percent by volume purity. 10,150 pounds of $Na_2CO_3$ and 4,210 pounds of $CO_2$ are separately withdrawn from the drum, said $CO_2$ being used in the carbonating towers as described above and the $Na_2CO_3$ being stored.

Effluent gases emanating from the filter wheel are directed to a filter gas scrubber through which approximately one-sixth of the aforementioned 6,160 gallons of brine is passed and scrubbed prior to being admitted to the absorber.

The ammonium chloride-containing liquor separated from the sodium bicarbonate in the filter wheel is conducted to a preheater, known as the still feed preheater, containing tubes through which the liquor passes, which tubes are externally heated to 85° C. by means of effluent gases coming off a lime still, stripping still and prelimer to be described hereinafter. Ammonium chloride liquor at 70° C. is removed from the preheater and fed to a stripping still wherein it is made to flow downwardly through a bed of coke and countercurrently to the effluent gases emanating from the prelimer and lime still mentioned above. From the stripping still the liquor is led to a prelimer where it is admixed with the $Ca(OH)_2$ slurry (27 percent by weight CaO as $Ca(OH)_2$) prepared in the rotary slaker as described above (see flow sheet).

Effluent gases from the prelimer are directed through the stripping still and still feed preheater. The $Ca(OH)_2$-$NH_4Cl$ mixture in the prelimer, which comprises a vessel equipped with a stirrer for agitating the mixture, is stirred and then introduced into a lime still where it flows downwardly over a series of vertically-disposed plates. Countercurrently thereto a stream of steam at 112° C. is introduced causing a reaction yielding calcium chloride and an ammonia-steam-containing gas. The calcium chloride-containing waste consists of 10,630 pounds of $CaCl_2$, 4,720 pounds of NaCl, 655 pounds of CaO, and 27,000 pounds of $H_2O$ and is discharged from the base of the lime still.

The ammonia-steam-containing gas (85° C.) is removed overhead from the lime still, admixed with effluent gases from the prelimer and passed through the stripping still countercurrently to downwardly-flowing ammonium chloride liquor. From the stripping still it passes to the still feed preheater where it contacts the tubes therein conveying ammonium chloride liquor and affords a heat exchange. From the preheater the ammonia-steam-containing gas is conducted to a still condenser where it comes into contact with a bank of water-conducting tubes having a temperature of 30° C. The steam condenses and relatively pure ammonia at a temperature of 57° C. is removed and passes upwardly through the absorber described above countercurrently to purified brine. Condensate from the condenser is introduced into the still feed preheater in heat exchange relationship with the ammonium chloride liquor-carrying tubes running therethrough. From the preheater it is led to the stripping still where it is admixed with the ammonium chloride liquor therein and carried to the prelimer, the lime still, etc.

Although the present invention has been described with reference to the specific details of certain embodiments, it is not intended that such embodiments shall be regarded as limitations upon the scope of the invention, except insofar as included in the accompanying claims.

The present application is a continuation of U. S. patent application Serial No. 535,109, filed September 19, 1955, now abandoned.

We claim:

1. A method of preparing acetylene and sodium bicarbonate which comprises the steps of: (1) calcining calcium carbonate to produce carbon dioxide and calcium oxide, (2) heating calcium oxide thus obtained with carbon to produce calcium carbide, (3) reacting resulting calcium carbide with water to produce acetylene and calcium hydroxide and separating the products, (4) reacting calcium hydroxide so obtained with ammonium chloride to produce ammonia and calcium chloride, (5) reacting ammonia produced in step (4) and carbon dioxide produced in step (1) with sodium chloride to produce ammonium chloride and sodium bicarbonate, (6) separating ammonium chloride from sodium bicarbonate and (7) recycling ammonium chloride thus-produced to step (4).

2. A method of preparing acetylene and sodium carbonate which comprises the steps of: (1) calcining calcium carbonate to produce carbon dioxide and calcium oxide, (2) reacting calcium oxide thus obtained with carbon to produce calcium carbide, (3) reacting resulting calcium carbide with water to produce acetylene and calcium hydroxide and separating the products, (4) reacting calcium hydroxide so obtained with ammonium chloride to produce ammonia and calcium chloride, (5) reacting ammonia produced in step (4) and carbon dioxide produced according to step (1) with sodium chloride to produce ammonium chloride and sodium bicarbonate, (6) separating ammonium chloride from sodium bicarbonate and recycling ammonium chloride to step (4), (7) heating sodium bicarbonate produced in step (5) to produce sodium carbonate and carbon dioxide and recycling carbon dioxide to step (5) to supplement carbon dioxide produced according to step (1).

3. A method of preparing acetylene and sodium carbonate which comprises the steps of: (1) calcining calcium carbonate to produce carbon dioxide and calcium oxide, (2) reacting calcium oxide thus obtained with carbon to produce calcium carbide, (3) reacting resulting calcium carbide with water to produce acetylene and calcium hydroxide and separating the products, (4) reacting calcium hydroxide so obtained with ammonium chloride to produce ammonia and calcium chloride, (5) reacting ammonia produced in step (4) and carbon dioxide produced according to step (1) with sodium chloride to produce ammonium chloride and sodium bicarbonate, (6) separating ammonium chloride from sodium bicarbonate and recycling ammonium chloride to step (4), (7) converting sodium bicarbonate produced in step (5) to sodium carbonate and carbon dioxide.

4. A method which comprises calcining calcium carbonate to produce calcium oxide and carbon dioxide, reacting together ammonia, sodium chloride and carbon dioxide thus obtained to produce ammonium chloride and sodium bicarbonate, separating the ammonium chloride from the sodium bicarbonate, converting sodium bicarbonate so produced to sodium carbonate and carbon dioxide, employing thus evolved carbon dioxide to supplement the carbon dioxide used to react with ammonia and sodium chloride, reacting with carbon a portion of the calcium oxide produced in the calcium carbonate calcining step to produce calcium carbide, reacting calcium carbide so obtained with water to produce acetylene and calcium hydroxide, separating acetylene from calcium hydroxide and admixing calcium hydroxide thus obtained with a second portion of calcium oxide produced in the calcium carbonate calcining step, reacting thus-mixed calcium hydroxide and calcium oxide with ammonium chloride produced in conjunction with the sodium bicarbonate whereby to liberate ammonia and to produce calcium chloride, and recycling liberated ammonia for reaction with further sodium chloride and carbon dioxide to produce sodium bicarbonate and ammonium chloride.

5. A method of preparing acetylene and sodium carbonate which comprises the steps of: (1) calcining calcium carbonate to produce carbon dioxide and calcium oxide, (2) heating a portion of the resulting calcium oxide with carbon to produce calcium carbide, (3) reacting calcium carbide thus produced with water to produce acetylene and calcium hydroxide and separating the products, (4) admixing calcium hydroxide thus obtained with a second portion of calcium oxide produced in the calcium carbonate calcining step, (5) reacting the resulting mixture with ammonium chloride to liberate ammonia and produce calcium chloride, (6) reacting thus liberated ammonia and carbon dioxide produced according to step (1) with sodium chloride to produce ammonium chloride and sodium bicarbonate, (7) separating ammonium chloride from the sodium bicarbonate and recycling ammonium chloride thus obtained to step (5), (8) calcining sodium bicarbonate thus obtained to produce sodium carbonate and carbon dioxide and recycling carbon dioxide thus produced to step (6) to supplement carbon dioxide produced according to step (1).

6. The process of claim 5 wherein all of the calcium carbide produced upon the reaction of calcium oxide and carbon is reacted to form acetylene and calcium hydroxide.

7. A method of preparing acetylene and sodium bicarbonate which comprises the steps of: (1) calcining calcium carbonate to produce carbon dioxide and calcium oxide, (2) heating a portion of the resulting calcium oxide with carbon to produce calcium carbide and carbon monoxide, (3) reacting calcium carbide thus produced with water to produce acetylene and calcium hydroxide and separating the products, (4) admixing calcium hydroxide so obtained and a second portion of calcium oxide produced in step (1), (5) reacting the resulting calcium hydroxide and calcium oxide mixture with ammonium chloride to produce ammonia and calcium chloride, (6) oxidizing carbon monoxide produced in step (2) to produce carbon dioxide, (7) reacting ammonia produced in step (5), carbon dioxide produced according to step (1) and carbon dioxide produced in step (6) with sodium chloride to produce ammonium chloride and sodium bicarbonate, (8) separating the resulting products and (9) recycling ammonium chloride thus produced to step (5).

8. A method of preparing acetylene and sodium carbonate which comprises the steps of: (1) calcining calcium carbonate to produce carbon dioxide and calcium oxide, (2) reacting calcium oxide so produced with carbon to produce calcium carbide, (3) reacting calcium carbide thus obtained with water to produce acetylene and calcium hydroxide and separating the products, (4) settling calcium hydroxide slurry solids and recycling supernatant liquid thus formed to react with further calcium carbide and water, (5) reacting thus-concentrated calcium hydroxide with ammonium chloride to produce ammonia and calcium chloride, (6) reacting ammonia thus obtained and carbon dioxide produced according to step (1) with sodium chloride to produce ammonium chloride and sodium bicarbonate, (7) separating these products of reaction and recycling ammonium chloride thus obtained to step (5) and (8) calcining sodium bicarbonate thus obtained to produce sodium carbonate and carbon dioxide and recycling carbon dioxide thus produced to step (6) to supplement carbon dioxide produced according to step (1).

9. The process of claim 1 wherein the ammonia and carbon dioxide are reacted with sodium chloride by introducing ammonia into a brine solution and introducing carbon dioxide into the thus-ammoniated brine.

10. A method of preparing acetylene and sodium carbonate which comprises the steps of (1) calcining calcium carbonate to produce carbon dioxide and calcium oxide, (2) reacting calcium oxide thus obtained with carbon to produce calcium carbide, (3) reacting the resulting calcium carbide with water to produce acetylene and calcium hydroxide and separating the products, (4) reacting calcium hydroxide so obtained with ammonium chloride to produce ammonia and calcium chloride, (5) reacting ammonia produced in step (4) and carbon dioxide with sodium chloride to produce ammonium chloride and sodium bicarbonate, (6) separating ammonium chloride from sodium bicarbonate and recycling ammonium chloride to step (4), and (7) converting sodium bicarbonate produced in step (5) to sodium carbonate and carbon dioxide and recycling carbon dioxide so obtained to step (5).

11. A method of preparing acetylene and sodium bicarbonate which comprises the steps of: (1) calcining calcium carbonate to produce carbon dioxide and calcium oxide, (2) reacting calcium oxide so produced with carbon to produce calcium carbide and carbon monoxide, (3) reacting calcium carbide thus obtained with water to produce acetylene and calcium hydroxide and separating the products, (4) reacting calcium hydroxide so obtained with ammonium chloride to produce ammonia and calcium chloride, (5) reacting ammonia produced in step (4) and carbon dioxide with sodium chloride to produce ammonium chloride and sodium bicarbonate, (6) separating ammonium chloride from sodium bicarbonate and recycling ammonium chloride to step (4), (7) oxidizing carbon monoxide produced in step (2) to produce carbon dioxide, and (8) recycling carbon dioxide in an above step to step (5).

No references cited.

UNITED STATES PATENT OFFICE
CERTIFICATE OF CORRECTION

Patent No. 2,845,329                                             July 29, 1958

Joseph A. Neubauer et al.

It is hereby certified that error appears in the printed specification of the above numbered patent requiring correction and that the said Letters Patent should read as corrected below.

Column 1, line 17, for "actylene" read -- acetylene --; column 4, line 35, for "$CaS_2$" read -- $CaC_2$ --; column 5, line 66, after "seen" insert -- in --; column 6, line 15, for "chlorine" read -- chloride --.

Signed and sealed this 14th day of April 1959.

(SEAL)
Attest:
KARL H. AXLINE

Attesting Officer

ROBERT C. WATSON
Commissioner of Patents